US012776233B2

(12) United States Patent
Shinohara et al.

(10) Patent No.: US 12,776,233 B2
(45) Date of Patent: Oct. 27, 2026

(54) DISPLAY SYSTEM

(71) Applicant: OMRON Corporation, Kyoto (JP)

(72) Inventors: Masayuki Shinohara, Kyoto (JP); Masao Mishina, Kyoto (JP); Norikazu Kitamura, Kyoto (JP); Yuto Mori, Kyoto (JP); Gouo Kurata, Kyoto (JP); Yutaka Okayasu, Kyoto (JP)

(73) Assignee: OMRON Corporation, Kyoto (JP)

( * ) Notice: Subject to any disclaimer, the term of this patent is extended or adjusted under 35 U.S.C. 154(b) by 264 days.

(21) Appl. No.: 18/489,029

(22) Filed: Oct. 18, 2023

(65) Prior Publication Data

US 2024/0169863 A1 May 23, 2024

(30) Foreign Application Priority Data

Nov. 10, 2022 (JP) ................................ 2022-180391

(51) Int. Cl.
*G09F 9/30* (2006.01)
*G02F 1/1335* (2006.01)
*G09F 13/04* (2006.01)
*G02B 3/00* (2006.01)

(52) U.S. Cl.
CPC .......... *G09F 9/30* (2013.01); *G02F 1/133504* (2013.01); *G02F 1/133526* (2013.01); *G02F 1/133607* (2021.01); *G09F 13/044* (2021.05); *G02B 3/0056* (2013.01)

(58) Field of Classification Search
USPC ........................................................ 359/463
See application file for complete search history.

(56) References Cited

U.S. PATENT DOCUMENTS

2004/0027041 A1* 2/2004 Nishikawa ............. B60K 35/28 313/506
2007/0052875 A1* 3/2007 Suzuki ................. G02B 6/0081 349/1
2022/0206734 A1 6/2022 Cuvillier et al.

FOREIGN PATENT DOCUMENTS

| | | |
|---|---|---|
| JP | H08129350 | 5/1996 |
| JP | 2005022615 | 1/2005 |
| JP | 2009096380 | 5/2009 |
| JP | 2010120408 | 6/2010 |
| JP | 2011180430 | 9/2011 |
| JP | 2013037241 | 2/2013 |
| JP | 2020184013 | 11/2020 |
| KR | 20220051509 | 4/2022 |

OTHER PUBLICATIONS

"Notice of Reasons for Refusal of Japan Counterpart Application", issued on Jun. 23, 2026, with English translation thereof, p. 1-p. 9.

* cited by examiner

*Primary Examiner* — Dung T Nguyen
(74) *Attorney, Agent, or Firm* — JCIPRNET

(57) ABSTRACT

The disclosure realizes a highly recognizable display system for an observer. A display system (1), including display switching devices (10A to 10D), displays multiple kinds of warnings in a predetermined area. The display switching devices switch multiple switching images including predetermined symbols to display display images in the predetermined area. The switching images include a symbol indicating one warning among the kinds of warnings.

6 Claims, 17 Drawing Sheets

(a)

(b)

(c)

DISPLAY SYSTEM

CROSS-REFERENCE TO RELATED APPLICATION

This application claims the priority benefits of Japanese application no. 2022-180391, filed on Nov. 11, 2022. The entirety of the above-mentioned patent application is hereby incorporated by reference herein and made a part of this specification.

TECHNICAL FIELD

The disclosure relates to a display system displaying multiple kinds of warnings.

BACKGROUND

For example, in a limited area such as the instrument panel of a vehicle, multiple kinds of warnings may be issued. Patent Document 1 (Japanese Patent Application Laid-Open (JP-A) No. 2009-96380) discloses a technique allowing the occupant to view an image indicating a warning displayed by irradiating light from the inside to the outside of a structural material through an opening formed in the structural material.

In the technique described in Patent Document 1, an area for displaying the images indicating multiple warnings is defined for each of the warnings, however, to issue multiple kinds of warnings in a limited area, the image indicating the warnings cannot be displayed in a large size, resulting in poor visibility of the image for the vehicle occupant.

One aspect of the disclosure is to realize a display system with high visibility of an image for an observer.

SUMMARY

The display system in one aspect of the disclosure displays multiple kinds of warnings in a predetermined area and includes: a display switching device, switching multiple switching images including predetermined symbols to display display images in the predetermined area. The switching images include a symbol indicating one warning among the kinds of warnings.

Figure 4:
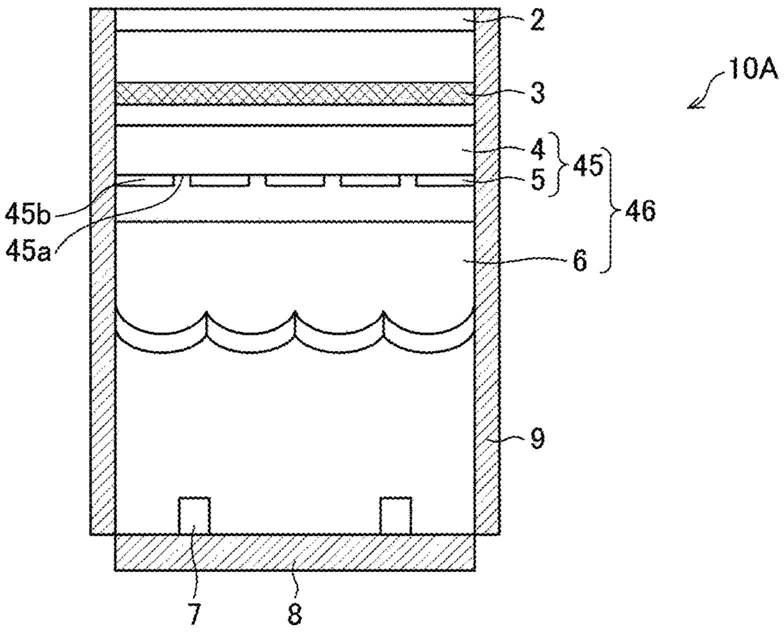
FIG. 4 is a schematic diagram illustrating the basic configuration of the display switching device provided in the display system.
Figure 5:
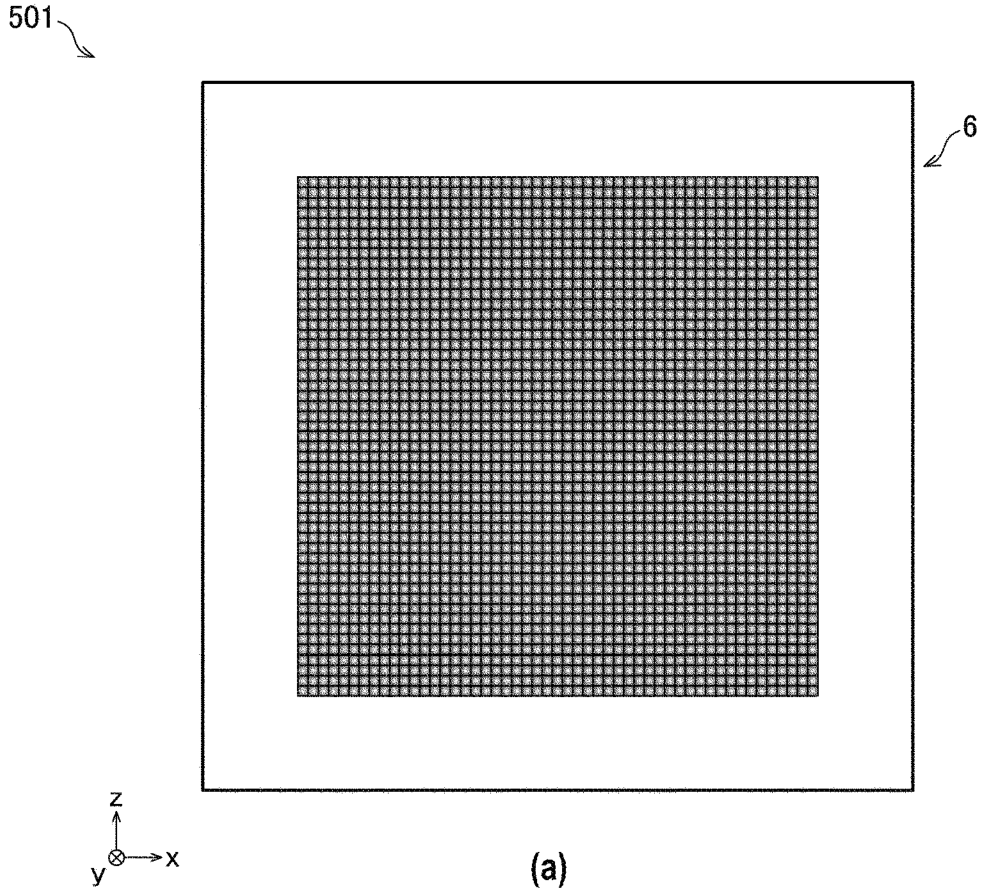
Figure 5:
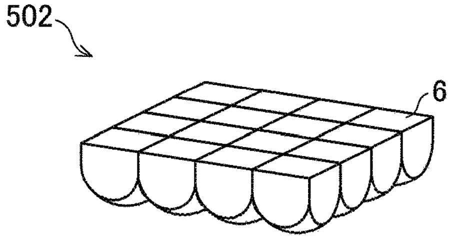
Figure 5:
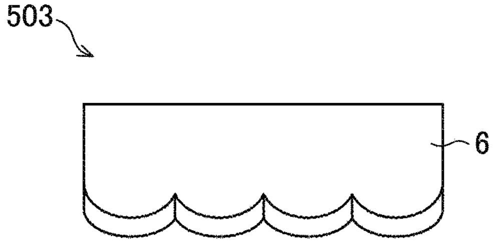

(a) to (c) of FIG. 5 indicated by sign 501, sign 502, and sign 503 respectively illustrate the configuration example of the lens array provided in the display switching device in FIG. 4.

Figure 6:
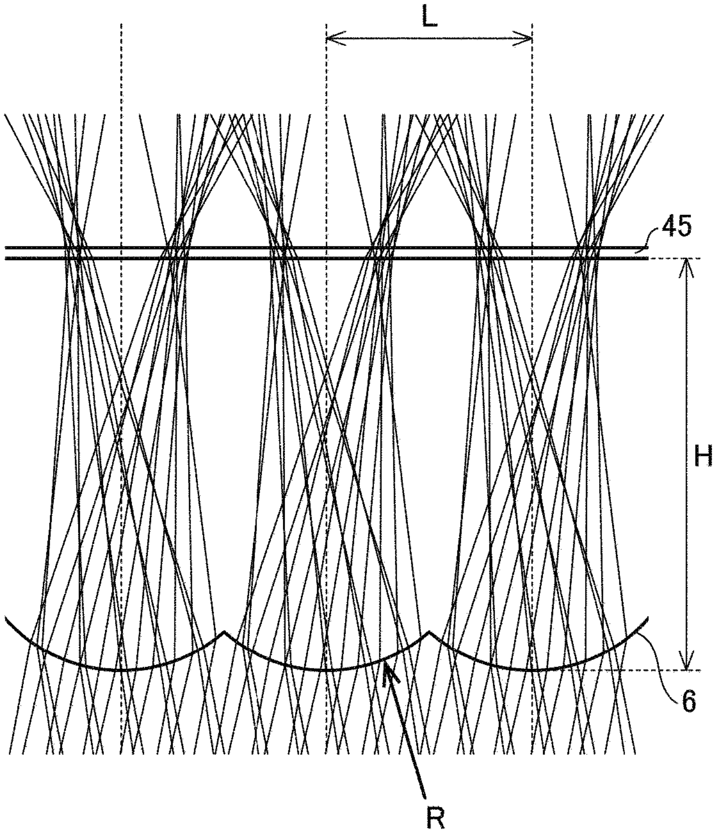

FIG. 6 illustrates an example the light condensing state using the lens array.

Figure 7:
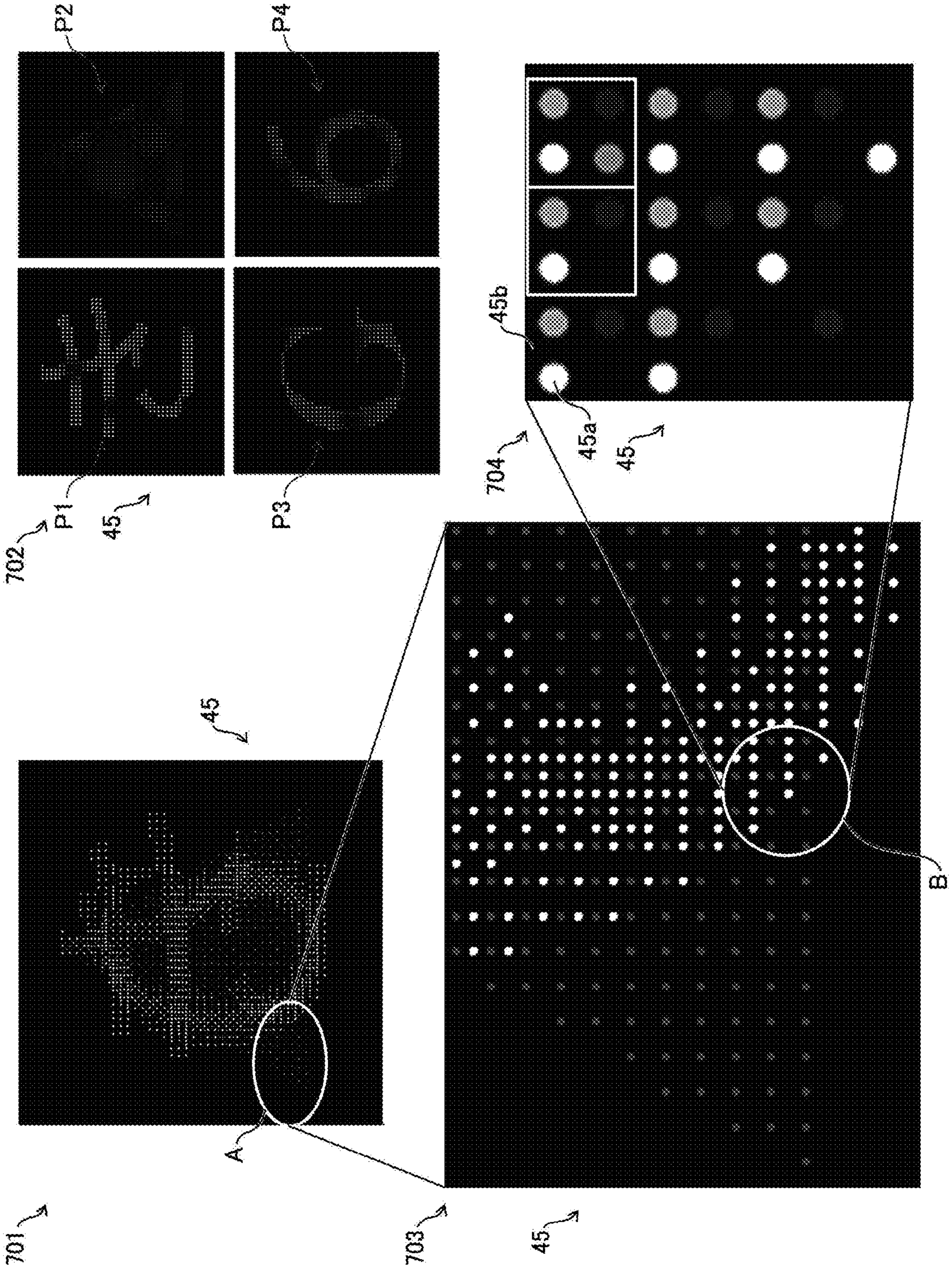

The figures indicated by sign 701, sign 702, sign 703, and sign 704 in FIG. 7 respectively illustrate the example of display switching of the display part provided in the display switching device.

Figure 8:
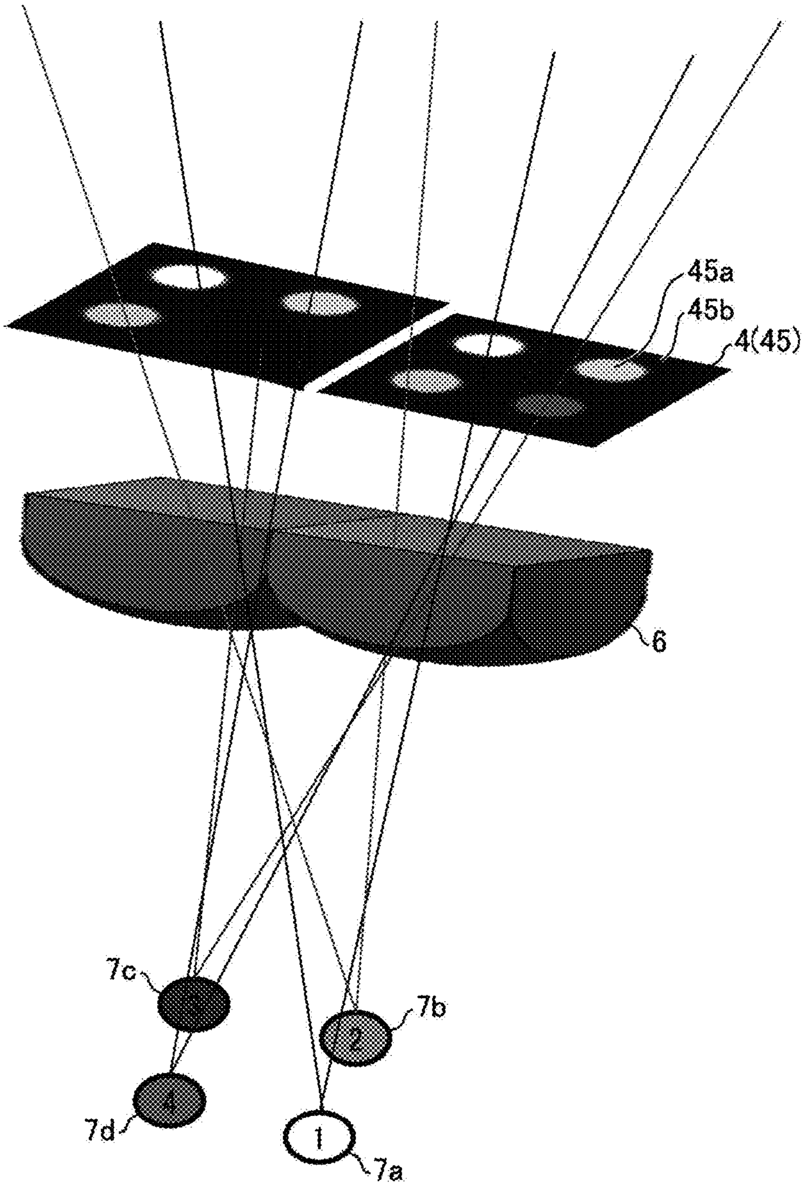

FIG. 8 illustrates the corresponding relationship between the display part, the lenses configuring the lens array, and the light sources.

Figure 9:
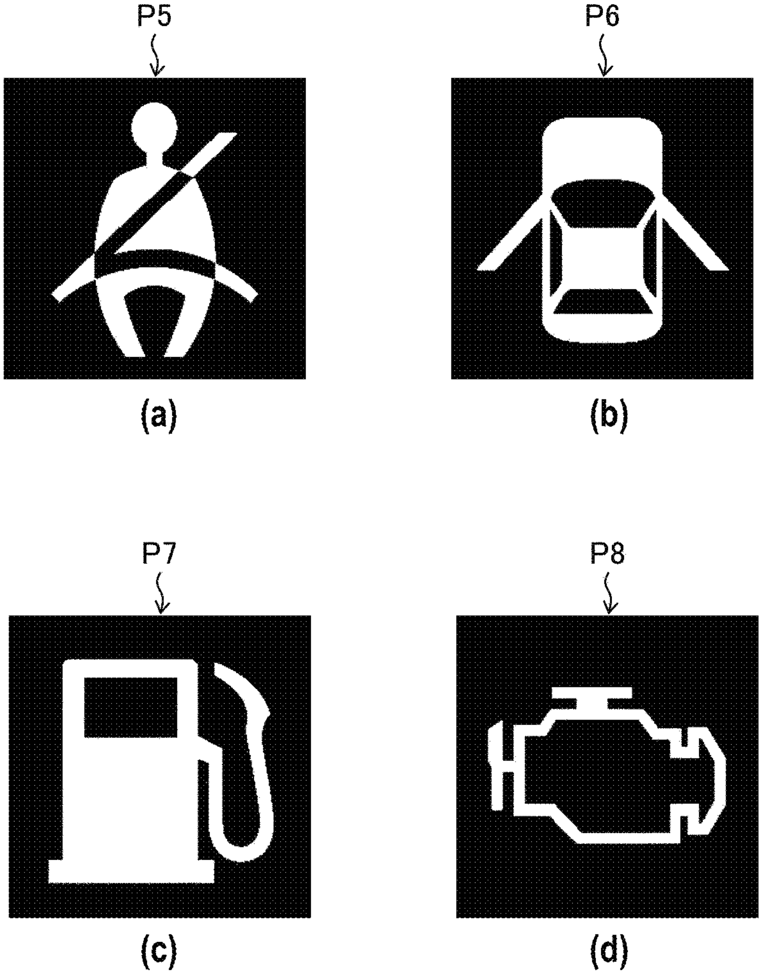

(a) to (d) of FIG. 9 illustrate the kinds of warnings displayed by the display system.

Figure 10:
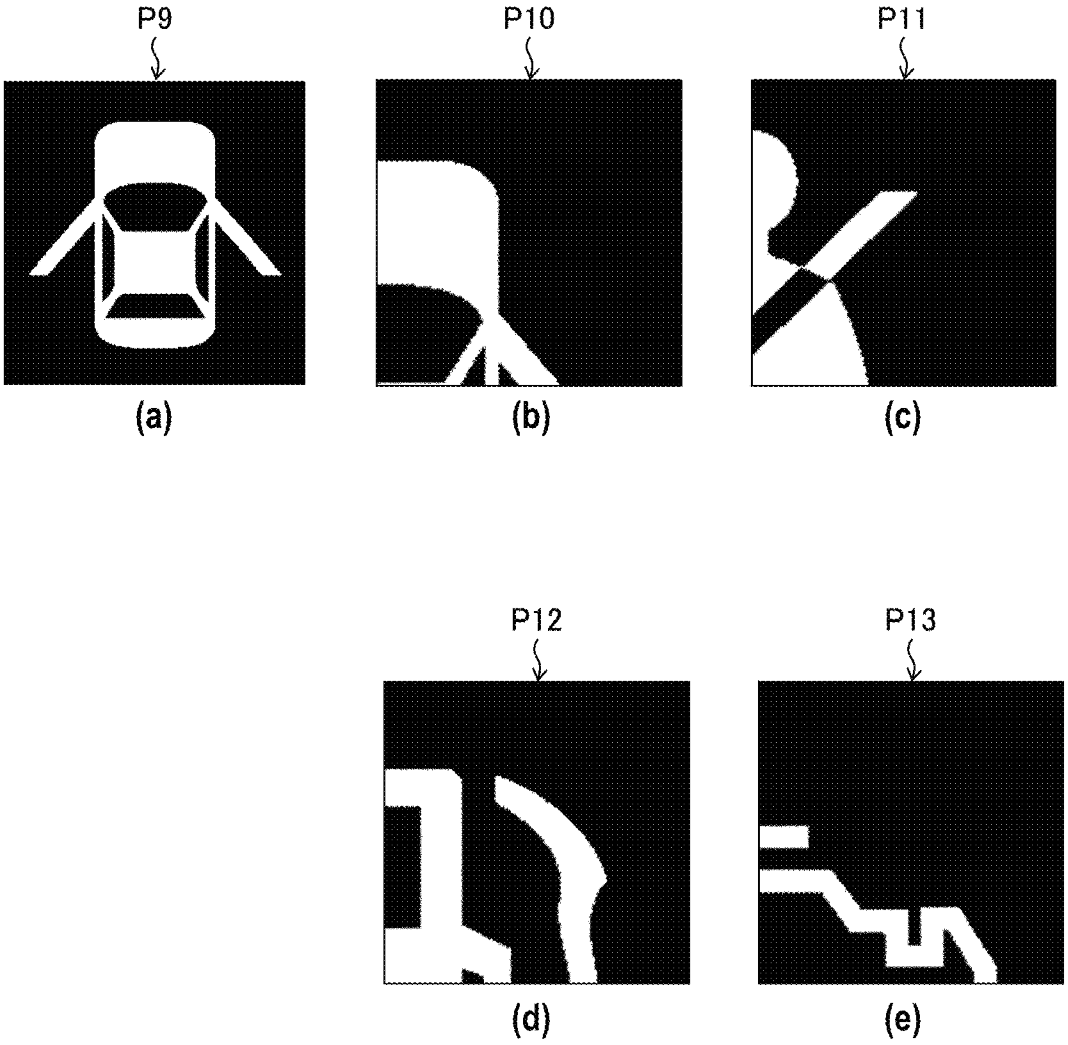

(a) to (e) of FIG. 10 illustrate images displayed by one of the display switching devices.

Figure 11:
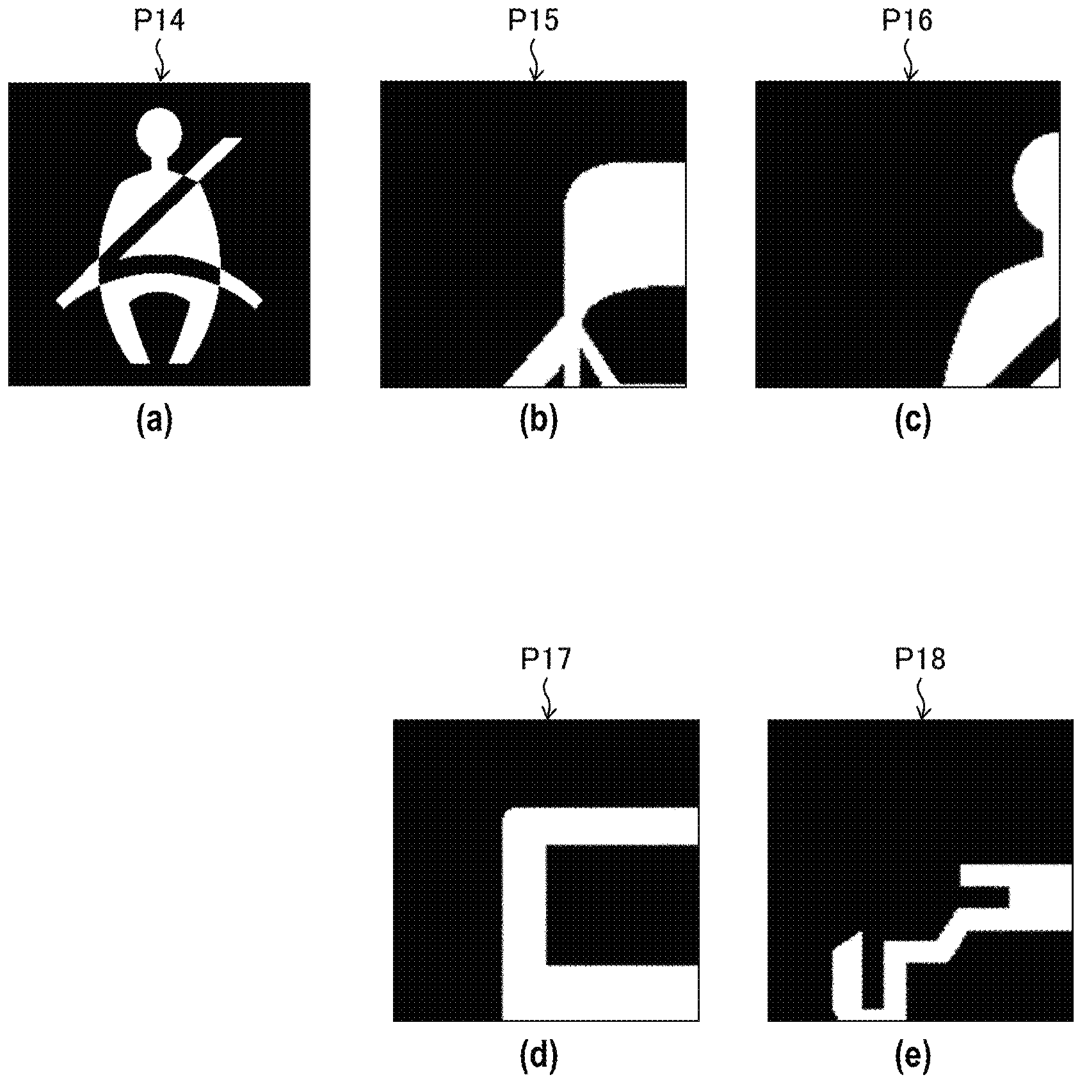

(a) to (e) of FIG. 11 illustrate images displayed by another display switching device.

Figure 12:
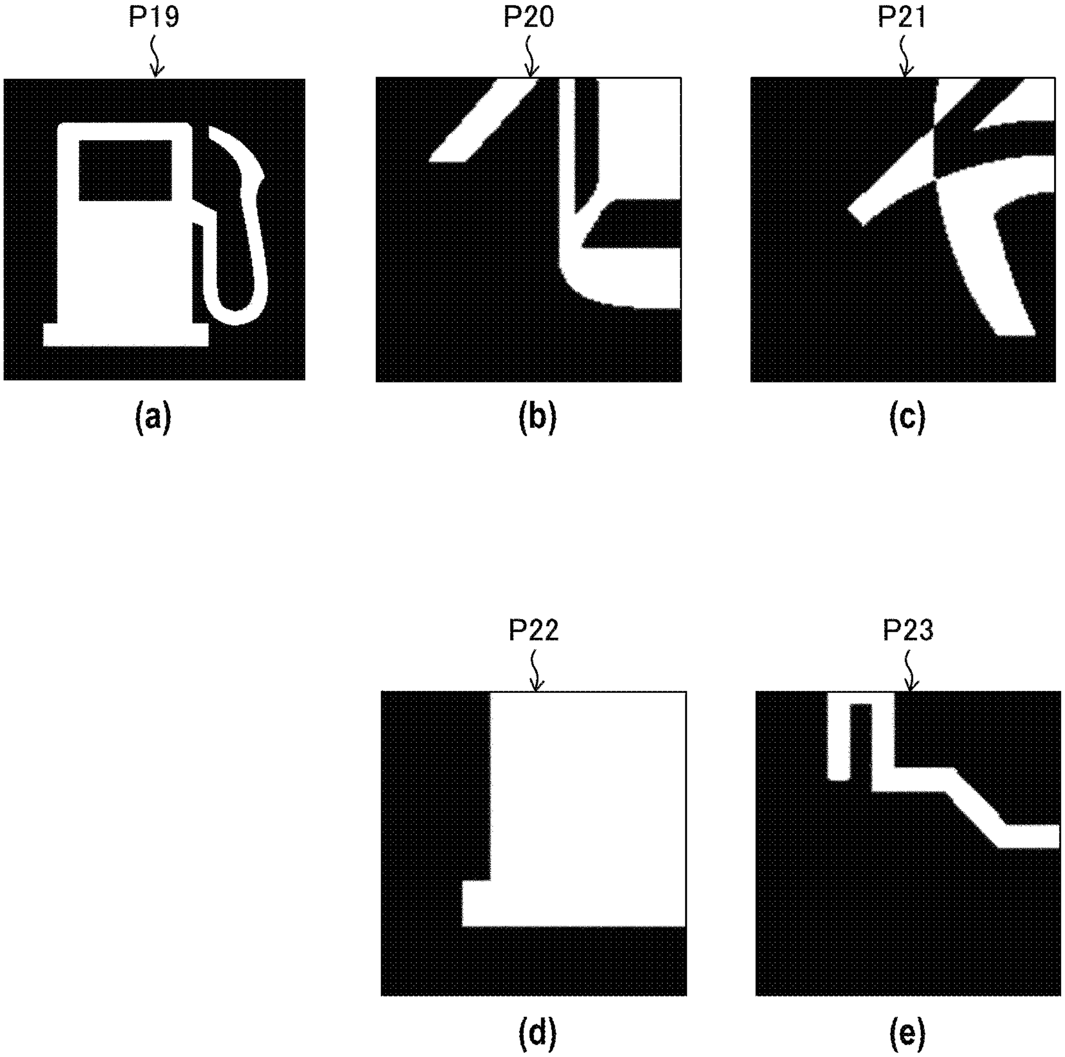

(a) to (e) of FIG. 12 illustrate images displayed by yet another display switching device.

Figure 13:
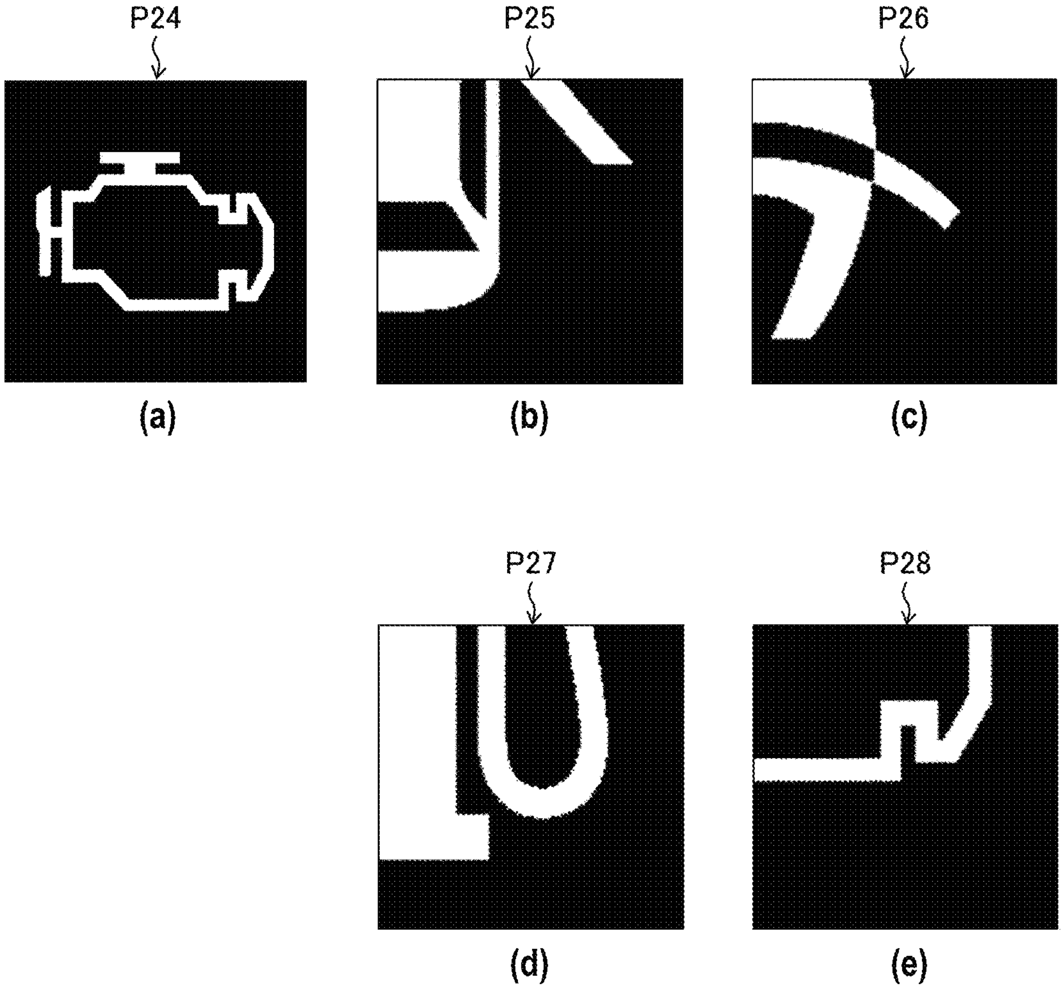

(a) to (e) of FIG. 13 illustrate images displayed by yet another display switching device.

Figure 14:
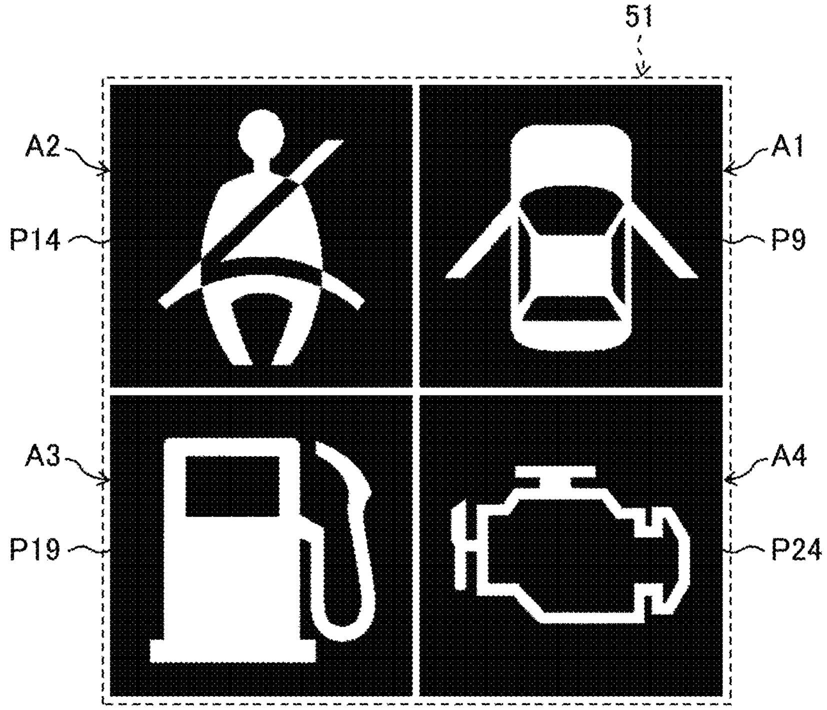

FIG. 14 illustrates the display images displayed in the first image display area in one operational example of the display system.

Figure 15:
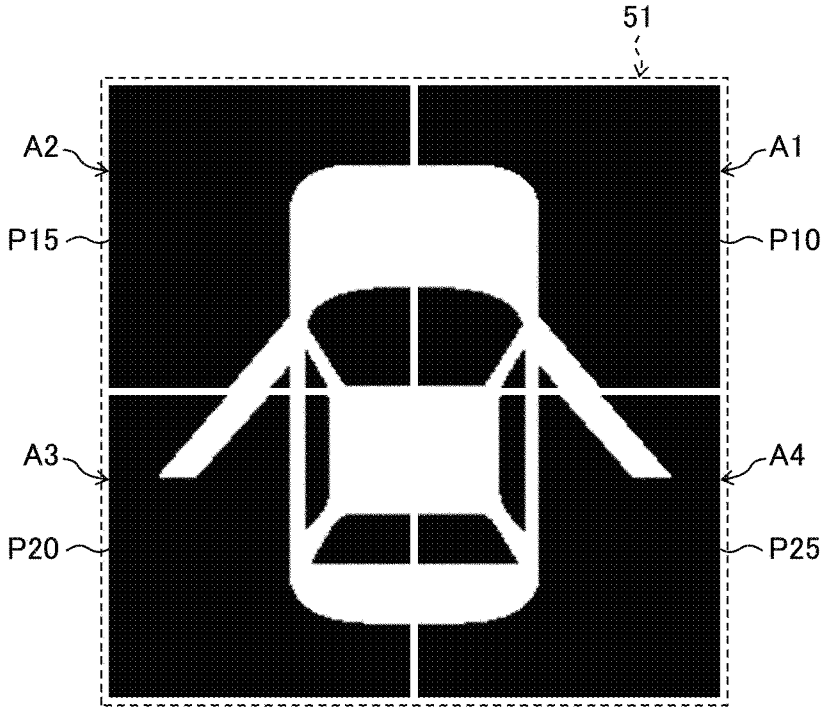

FIG. 15 illustrates the display images displayed in the first image display area in another operational example of the display system.

Figure 16:
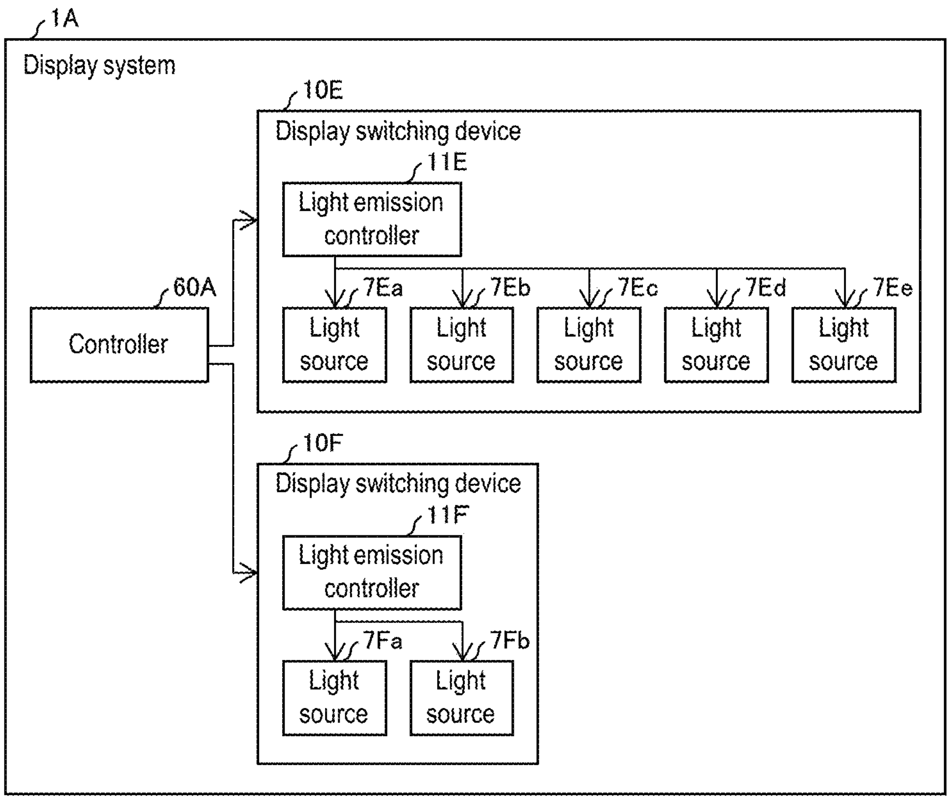

FIG. 16 is a block diagram of the display system according to embodiment 2 of the disclosure.

Figure 17:
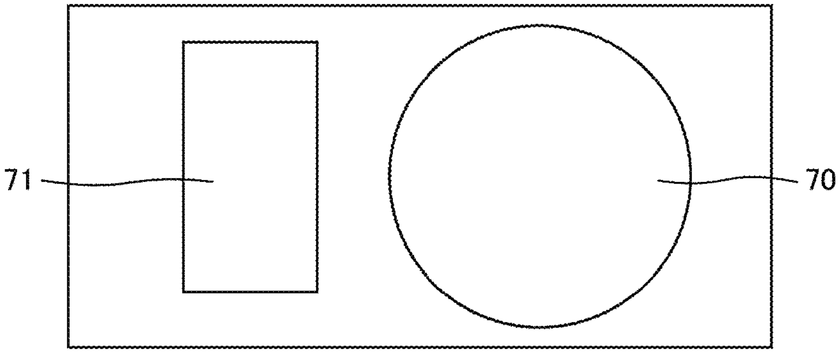

FIG. 17 illustrates the surroundings of the power supply port of the electric vehicle in which the display system is installed.

Figure 18:
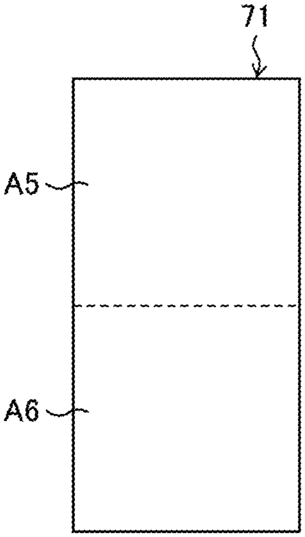

FIG. 18 illustrates an image display area provided near the power supply port.

Figure 19:
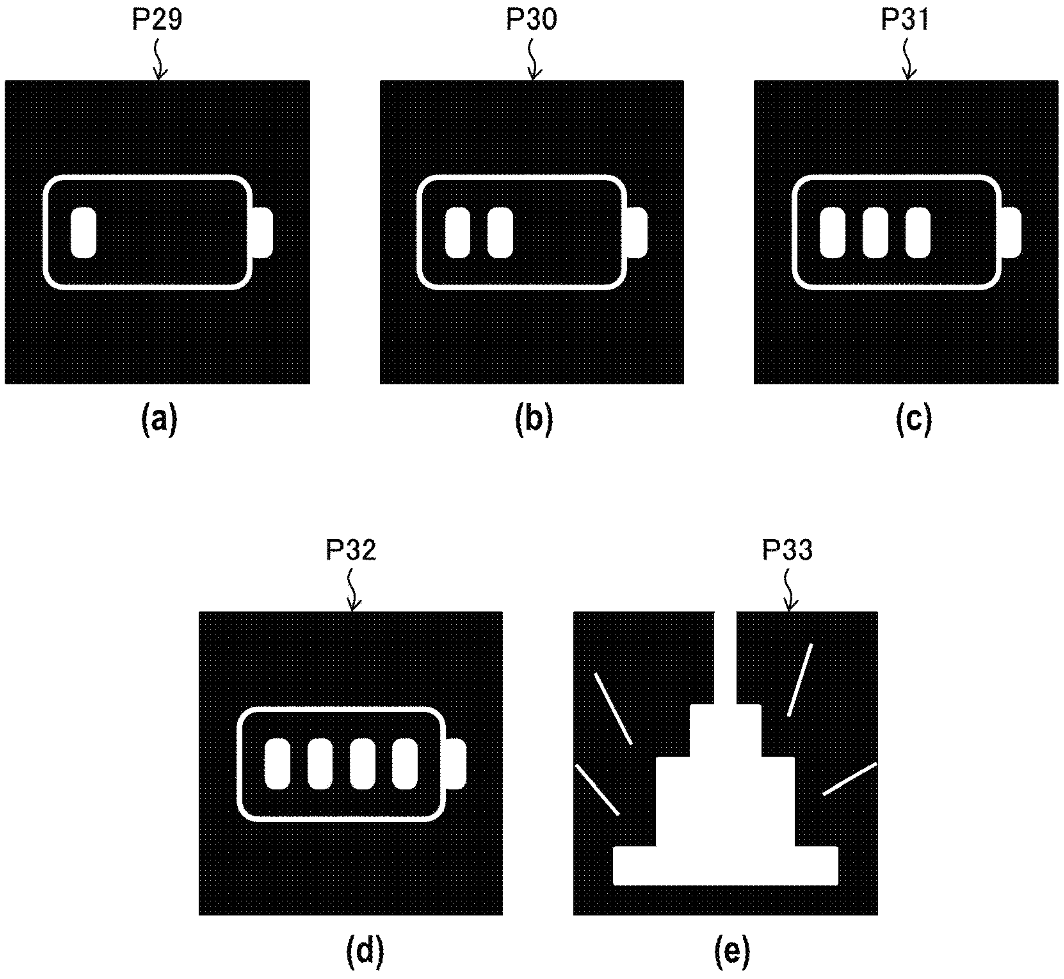

(a) to (e) of FIG. 19 illustrate images displayed by one of the display switching devices provided in the display system.

Figure 20:
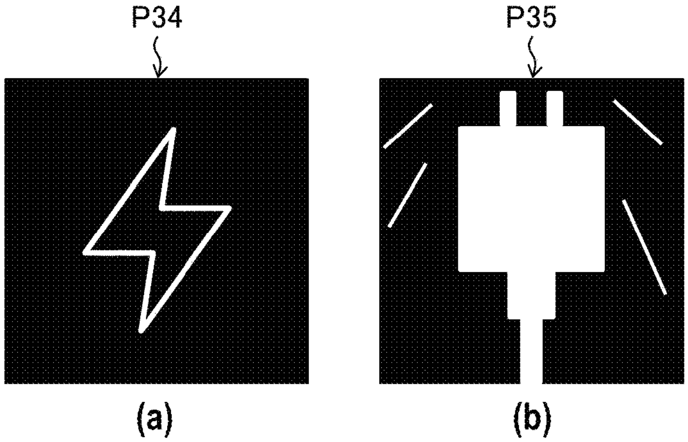

(a) and (b) of FIG. 20 illustrate images displayed by another display switching device provided in the display system.

Figure 21:
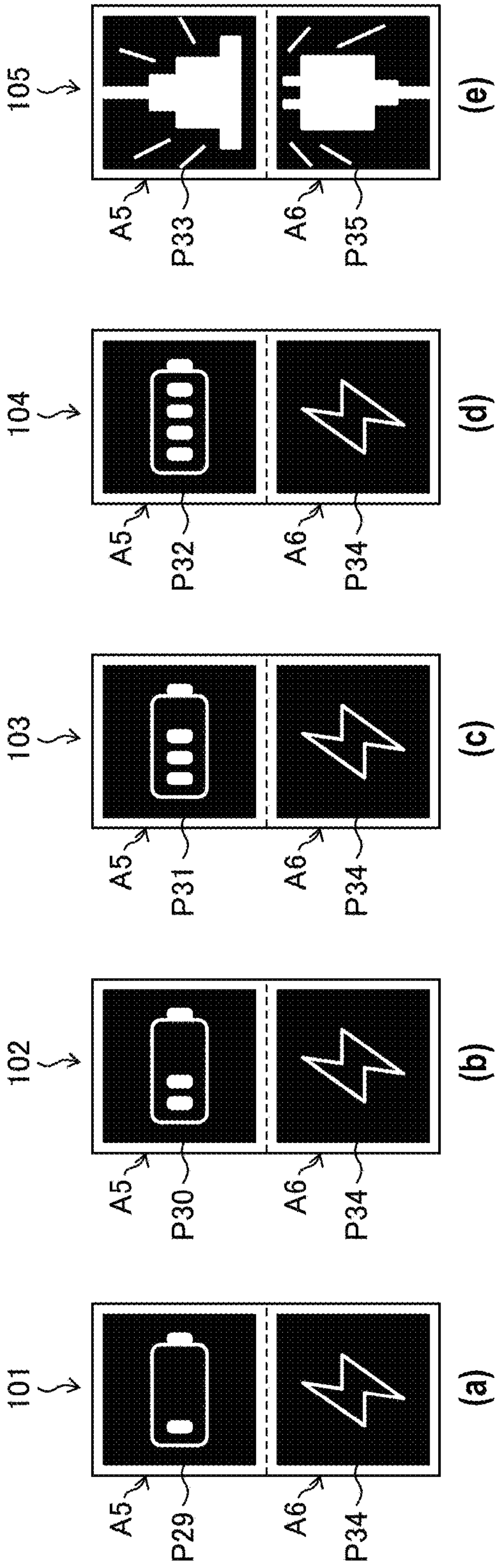

(a) to (e) of FIG. 21 illustrate display examples of the display system.

DETAILED DESCRIPTION

The display system in one aspect of the disclosure displays multiple kinds of warnings in a predetermined area and includes: a display switching device, switching multiple switching images including predetermined symbols to display display images in the predetermined area. The switching images include a symbol indicating one warning among the kinds of warnings.

According to this configuration, since the switching images are switched and displayed in the predetermined area, the symbol is able to be displayed larger than when multiple symbols indicating multiple kinds of warnings are displayed at the same time. As a result, the visibility of the image (symbol) for the observer is improved.

The display system may include multiple display switching devices. The display switching devices may respectively display the display images in partial areas not overlapping each other in the predetermined area and may be capable of displaying the switching images indicating one warning among the kinds of warnings. An image indicating a warning may be displayed in the predetermined area by combining the display images displayed by at least two of the display switching devices among the display switching devices.

According to the above configuration, when displaying multiple warnings, multiple warnings are respectively displayed in the partial areas, and when displaying only one warning, the image indicating the warning is able to be displayed in a large size by combining the display images.

The display system may be configured such that the image indicating the warning displayed by combining the display images displayed by at least two of the display switching devices among the display switching devices is an image indicating one warning among the kinds of warnings.

According to the above configuration, when displaying multiple warnings, multiple warnings are respectively displayed in the partial areas, and when displaying only one warning, the image indicating the warning is able to be displayed in a large size by combining the display images.

The display system may be configured to be installed in an interior of a vehicle. According to the above configuration, multiple warnings are able to be displayed in the interior of the vehicle where space is limited, so that the passengers is able to easily recognize the same.

The display switching device of the display system may be a display switching device for switching the display images by switching irradiations of light from multiple light sources The display switching device may include a lens array in which multiple lenses are arranged and a display part including multiple pixel areas arranged to include an area through which light formed by condensing each light emitted from the light sources with each of the lenses of the lens array passes. A transmittance of each of the pixel areas may be set corresponding to a predetermined stationary symbol.

This configuration enables display switching without using a liquid crystal display. This enables the realization of a display switching device at a lower cost than using a liquid crystal display.

One aspect of the disclosure is capable of realizing a highly recognizable display system for an observer.

Embodiment 1

One embodiment (hereinafter also referred to as "this embodiment") according to one embodiment of the disclosure will be described below with reference to the drawings.

A display system of the disclosure is a display system that displays multiple kinds of warnings to an observer. This embodiment describes a display system 1 installed in the interior of a vehicle as one aspect of the display system of the disclosure.

§ 1 Application Example

Figure 1:
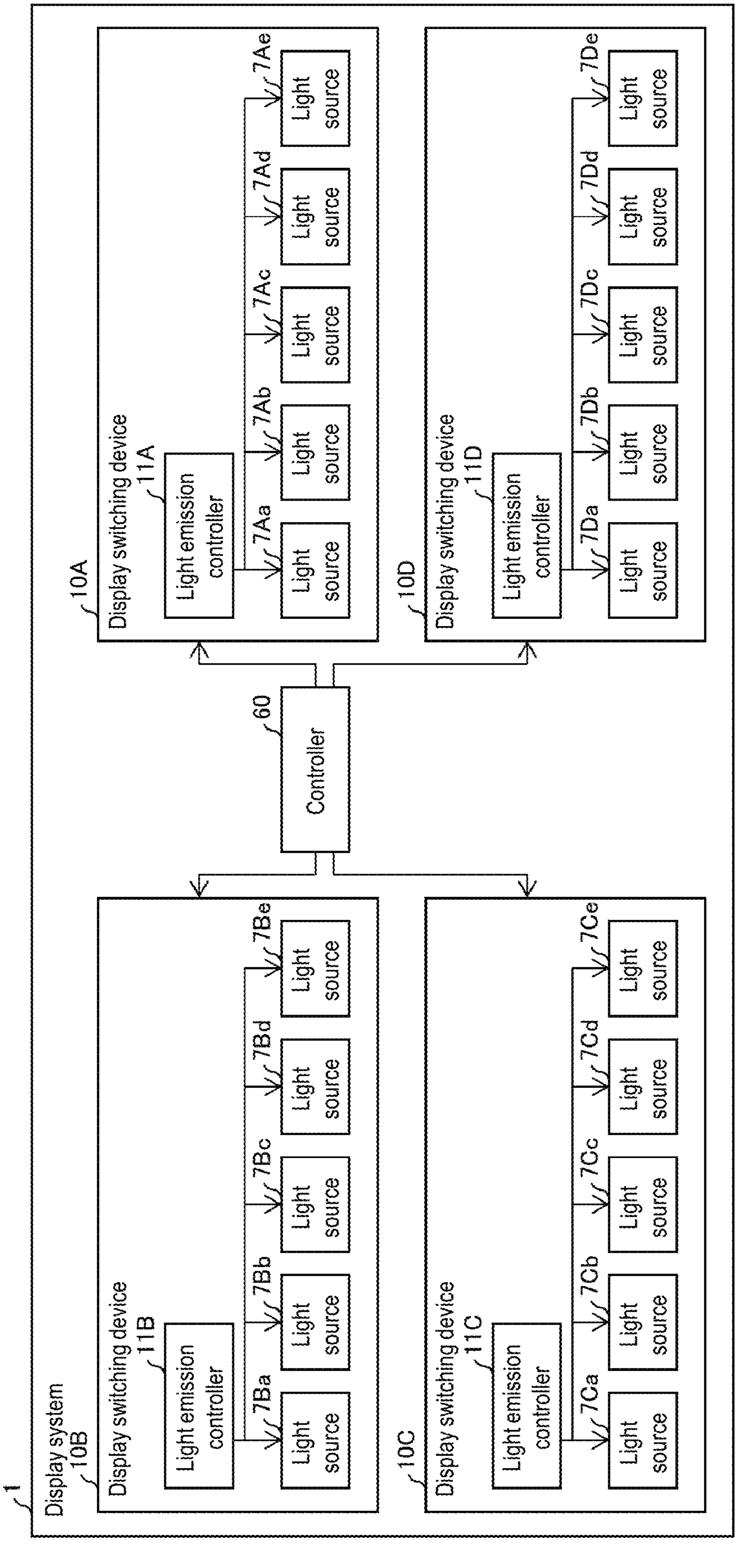
FIG. 1 is a block diagram of the display system according to embodiment 1 of the disclosure.
Figure 2:
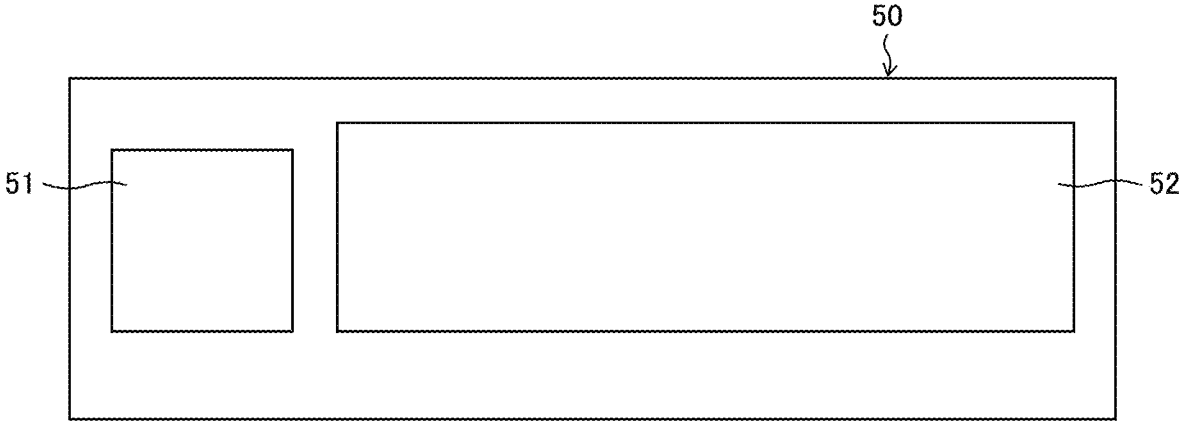
FIG. 2 illustrates an instrument panel of the vehicle in which the display system is installed.
Figure 3:
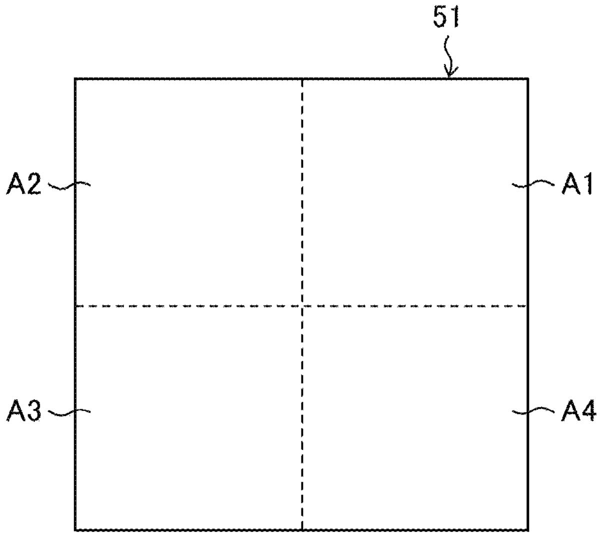
FIG. 3 illustrates a first image display area of the instrument panel.

First, an example of the scenario where the display system 1 is applied will be described with reference to FIG. 1, FIG. 2, FIG. 3, FIG. 14, and FIG. 15. FIG. 1 is a block diagram of the display system 1. FIG. 2 illustrates an instrument panel 50 of the vehicle in which the display system 1 is installed. FIG. 3 illustrates the first image display area 51 of the instrument panel 50.

The display system 1 displays the image in the first image display area 51 of the instrument panel 50 shown in FIG. 2. The display system 1 includes display switching devices 10A to 10D as shown in FIG. 1. The display switching devices 10A to 10D switch the switching images including the predetermined symbols to respectively display the display images in the first partial area A1 to the fourth partial area A4 of the first image display area 51 shown in FIG. 3.

In the display system 1, (1) as shown in FIG. 14, each of the first partial area A1 to the fourth partial area A4 is capable of displaying images indicating multiple warnings; (2) as shown in FIG. 15, an image indicating any one warning among the kinds of warnings is allowed to be displayed in the entire area of the first image display area 51 by combining the display images displayed in the first partial area A1 to the fourth partial area A4. As a result, the display system 1 is a highly recognizable display system for the driver of the vehicle.

§ 2 Configuration Example

Next, the details of the configuration of the display system 1 will be described. The display system 1 includes display switching devices 10A to 10D and a controller 60.

FIG. 2 illustrates the instrument panel 50 of the vehicle. The instrument panel 50 includes the first image display area 51, in which the image is displayed by the display system 1, and a second image display area 52, in which an image is displayed by a conventionally known technique. In the first image display area 51, images indicating the kinds of warnings are displayed. The second image display area 52 displays various information such as speedometer, tachometer, and fuel gauge.

FIG. 3 illustrates the first image display area 51. As shown in FIG. 3, the first image display area 51 is configured by the first partial area A1 in which the image is displayed by the display switching device 10A, the second partial area A2 in which the image is displayed by the display switching device 10B, the third partial area A3 in which the image is displayed by the display switching device 10C, the fourth partial area A4 in which the image is displayed by the display switching device 10D. The first partial area A1 to the fourth partial area A4 are the upper right area, the upper left area, the lower left area, and the lower right area of the first image display area 51, respectively. The first partial area A1 to the fourth partial area A4 do not overlap each other.

The display switching devices 10A to 10D switch the switching images including the predetermined symbols to respectively display the display images in the first partial area A1 to the fourth partial area A4.

The display switching devices 10A to 10D have the same structure except that the predetermined symbols mentioned above are different from each other. The display switching device 10A will be explained first.

FIG. 4 is a schematic diagram illustrating the basic configuration of the display switching device 10A according to this embodiment. As shown in FIG. 4, the display switching device 10A includes, in the order from top to bottom in the drawing, a light absorbing member 2, a light diffusion member 3, a display light condenser 46, multiple light sources 7, and a substrate 8 to which the light sources 7 are attached.

The light absorbing member 2, the light diffusion member 3, the display part 45, and the lens array 6 are supported by a housing 9. Furthermore, by attaching the housing 9 to the substrate 8 to which the light sources 7 are attached, the basic configuration of the display switching device 10A is completed. The display switching device 10A is also allowed to have a protective layer over the light absorbing member 2 to prevent damage. The size of each member described above is appropriately designed according to the size of the area in which the display switching device 10A displays the image.

The light absorbing member 2 is a member that absorbs light, and the light diffusion member 3 is a member that diffuses light. That is, the light absorbing member 2 and the light diffusion member 3 are collectively called a dimming member. As a configuration example of the dimming member, for example, a smoked member, a half mirror, a polarizing plate, a color plate, a diffusion plate, a member that displays a display image, and a smoked member having a diffusion function in combination with a diffusion plate are allowed to be used.

The display light condenser 46 includes the display part 45 and a micro lens array (hereinafter abbreviated as the lens array) 6. The display part 45 includes an image layer 4 and a matrix layer 5, and displays an image (display image) P to be displayed. The matrix layer 5 includes, for example, a pixel area 45*a* (opening, the same hereinafter) and a pixel surrounding area 45*b* (mask, the same hereinafter) which is an area other than the pixel area 45*a*. The image layer 4 and the matrix layer 5 are joined to each other. The "pixel surrounding area 45*b*" herein refers to an area in which the transmittance is constant and which is located around each of the pixel areas 45*a*. Moreover, the pixel surrounding area 45*b* blocks the light from the light source, that is, the light from a side where the lens array 6 is provided.

As shown in FIG. 4, the lens array 6 provided below the display part 45 collects the light emitted from the light sources 7 attached to the substrate 8. The lens array 6 is configured by arranging multiple lenses.

The display part 45 includes multiple pixel areas 45*a* arranged to include an area through which light formed by condensing each light emitted from the positions of the light sources 7 with each of the lenses of the lens array 6 passes, and a transmittance of each of the pixel areas 45*a* is set corresponding to a predetermined stationary symbol.

The light sources 7 may be, for example, red-green-blue light emitting diodes (RGB LEDs).

With the configuration as described above, the display switching device 10A is capable of switching the display images by switching the irradiations of light from the light sources 7. In addition, the switching on/off of the light sources 7 is performed by a light emission controller 11A, as shown in FIG. 1.

Configuration Example of the Lens Array (a) to (c) of FIG. 5 indicated by sign 501, sign 502, and sign 503 respectively illustrate the configuration example of the lens array 6 in FIG. 6. Specifically, as shown in (a) indicated by sign 501 in FIG. 5, the lens array 6 is configured by arranging multiple lenses in a two-dimensional matrix.

(b) indicated by sign 502 in FIG. 5 is a perspective view illustrating the partially enlarged lens array 6, and (c) indicated by sign 503 in FIG. 5 is a partial cross-sectional view of the partially enlarged lens array 6.

FIG. 6 illustrates an example of the light condensing state using the lens array 6. From FIG. 6, it can be understood that the light condensing point can be changed by changing the position of the light sources.

The figures indicated by sign 701, sign 702, sign 703, and sign 704 in FIG. 7 respectively illustrates the example of display switching of the display part 45. In FIG. 7, the figure indicated by sign 701 is a display example displayed on the display part 45 (image layer 4); the figures indicated by sign 702 are examples of the symbols to be displayed; the figure indicated by sign 703 is an enlarged view of part A of the figure indicated by sign 701; and the figure indicated by sign 704 is an enlarged view of part B of the figure indicated by sign 703.

In the display example shown in FIG. 7, for example, in the same image layer, the display is capable of switching and displaying an image P1 (hiragana "き" in the example), an image P2 (symbol "Δ" in the example), an image P3 (capital letter "G" in the example), and an image P4 (number "6" in the example).

As an example, as indicated by sign 704 in FIG. 7, it is possible to switch the display by dividing the entire display part 45 into multiple areas (multiple pixels) so that a maximum of four pixel areas 45*a* are included in one area. Also, as indicated by sign 704 in FIG. 7, the area other than the pixel area 45*a* of the display part 45 is the pixel surrounding area 45*b*.

FIG. 8 illustrates the corresponding relationship between the display part 45, the lenses configuring the lens array 6, and the light sources 7. In FIG. 8, two pixels are exemplified, and the light from the light sources is collected by the lens array 6 and emitted from the corresponding pixel area 45*a*, respectively. Each of the pixels of the display part 45 is divided into the pixel area 45*a* and the pixel surrounding area 45*b*.

By using the display switching device as described above as the display switching device 10A, image switching is performed without using the liquid crystal display. This enables the realization of a display switching device at a lower cost than using a liquid crystal display.

Moreover, in the above description, the aspect of switching four images P1 to P4 by the display switching device 10A was described. However, the display switching device 10A disclosed herein is capable of switching and displaying five or more images by appropriately adjusting the number of divisions in the display part 45 and the number of light sources according to the desired number of displayed images.

(a) to (d) of FIG. 9 illustrate the kinds of warnings displayed by the display system 1. In the following description, as an example, within the first image display area 51 of the instrument panel 50, the display system 1 displays the following four kinds of warning images in FIG. 9: (1) seat belt non-fastened warning light indicated by image P5; (2) incompletely closed door warning light indicated by image P6; (3) fuel level warning light indicated by image p'7; and (4) engine warning light indicated by image P8. However, the display system of the disclosure is not limited thereto, and is capable of displaying warnings other than the above warnings, or is capable of displaying warning images of 5 kinds or more.

In the following description, the display switching device 10A is provided with five light sources 7Aa to 7Ae as the light sources 7 as shown in FIG. 1, and is displayed by switching between five switching images. (a) to (e) of FIG. 10 illustrate images displayed by the display switching device 10A. The display switching device 10A is configured to: (1) display the incompletely closed door warning light (image P9 shown in FIG. 10) by irradiating light from the light source 7Aa; (2) display the upper right area of the incompletely closed door warning light (image P10 shown in FIG. 10) by irradiating light from the light source 7Ab; (3) display the upper right area of the seat belt non-fastened warning light (image P11 shown in FIG. 10) by irradiating light from the light source 7Ac; (4) display the upper right area of the fuel level warning light (image P12 shown in FIG. 10) by irradiating light from the light source 7Ad; and (5) display the upper right area of the engine warning light (image P13 shown in FIG. 10) by irradiating light from the light source 7Ae.

As shown in FIG. 1, the display switching device 10B is provided with five light sources 7Ba to 7Be and a light emission controller 11B for controlling the switching on/off of the light sources 7Ba to 7Be. (a) to (e) of FIG. 11 illustrate images displayed by the display switching device 10B. The display switching device 10B is configured to: display the seat belt non-fastened warning light (image P14 shown in FIG. 11) by irradiating light from the light source 7Ba, and display the upper left area of the incompletely closed door warning light (image P15 shown in FIG. 11), the upper left area of the seat belt non-fastened warning light (image P16 shown in FIG. 11), the upper left area of the fuel level warning light (image P17 shown in FIG. 11), and the upper left area of the engine warning light (image P18 shown in FIG. 11) by irradiating light from the light sources 7Bb to 7Be, respectively.

As shown in FIG. 1, the display switching device 10C is provided with five light sources 7Ca to 7Ce and a light emission controller 11C for controlling the switching on/off of the light sources 7Ca to 7Ce. (a) to (e) of FIG. 12 illustrate images displayed by the display switching device 10C. The display switching device 10C is configured to: display the fuel level warning light (image P19 shown in FIG. 12) by irradiating light from the light source 7Ca, and display the lower left area of the incompletely closed door warning light (image P20 shown in FIG. 12), the lower left area of the seat belt non-fastened warning light (image P21 shown in FIG. 12), the lower left area of the fuel level warning light (image P22 shown in FIG. 12), and the lower left area of the engine warning light (image P23 shown in FIG. 12) by irradiating light from the light sources 7Cb to 7Ce, respectively.

As shown in FIG. 1, the display switching device 10D is provided with five light sources 7Da to 7De and a light emission controller 11D for controlling the switching on/off of the light sources 7Da to 7De. (a) to (e) of FIG. 13 illustrate images displayed by the display switching device 10D. The display switching device 10D is configured to: display the engine warning light (image P24 shown in FIG. 13) by irradiating light from the light source 7Da, and display the lower right area of the incompletely closed door warning light (image P25 shown in FIG. 13), the lower right area of the seat belt non-fastened warning light (image P26 shown in FIG. 13), the lower right area of the fuel level warning light (image P27 shown in FIG. 13), and the lower right area of the engine warning light (image P28 shown in FIG. 13) by irradiating light from the light sources 7Db to 7De, respectively.

The controller 60 controls the operations of the display switching devices 10A to 10D. Specifically, the controller 60 acquires vehicle information from each of the sensors provided in the vehicle and outputs instructions to the display switching devices 10A to 10D so as to display warnings according to the acquired vehicle information.

§ 3 Operational Example

Next, an operational example using the display system 1 will be described.

Operational Example 1

In this operational example, the case where the seat belt non-fastened warning light, the incompletely closed door warning light, the fuel level warning light, and the engine warning light are displayed in the first image display area 51 of the instrument panel 50 is described. In this case, the controller 60 outputs instructions to the display switching devices 10A to 10D to display the seat belt non-fastened warning light, the incompletely closed door warning light, the fuel level warning light, and the engine warning light, respectively. Upon receiving the instructions, the light emission controller 11A of the display switching device 10A causes the light source 7Aa to emit light. Similarly, the light emission controllers 11B to 11D of the display switching devices 10B to 10D causes the light sources 7Ba to 7 Da to emit light, respectively. FIG. 14 illustrates the display images displayed in the first image display area 51 of the instrument panel 50 in this operational example. As shown in FIG. 14, (1) by causing the light source 7Aa to emit light, the display switching device 10A displays the image P9 indicating the incompletely closed door warning light in the first partial area A1 of the first image display area 51; (2) by causing the light source 7Ba to emit light, the display switching device 10B displays the image P14 indicating the seat belt non-fastened warning light in the second partial area A2 of the first image display area 51; (3) by causing the light source 7Ca to emit light, the display switching device 10C displays the image P19 indicating the fuel level warning light in the third partial area A3 of the first image display area 51; and (4) by causing the light source 7Da to emit light, the display switching device 10D displays the image P24 indicating the engine warning light in the fourth partial area A4 of the first image display area 51.

Operational Example 2

In this operational example, the case where only the incompletely closed door warning light is displayed in the first image display area 51 of the instrument panel 50 is described. In this case, the controller 60 outputs instructions to the display switching devices 10A to 10D to display one part of the incompletely closed door warning light, respectively. Upon receiving the instructions, the light emission controller 11A of the display switching device 10A causes the light source 7Ab to emit light. Similarly, the light emission controllers 11B to 11D of the display switching devices 10B to 10D causes the light sources 7Bb to 7Db to emit light, respectively. FIG. 15 illustrates the display images displayed in the first image display area 51 of the instrument panel 50 in this operational example. As shown in FIG. 15, (1) by causing the light source 7Ab to emit light, the display switching device 10A displays the upper right area of the incompletely closed door warning light (image P10 shown in FIG. 10) in the first partial area A1 of the first image display area 51; (2) by causing the light source 7Bb to emit light, the display switching device 10B displays the upper left area of the incompletely closed door warning light (image P15 shown in FIG. 11) in the second partial area A2 of the first image display area 51; (3) by causing the light source 7Cb to emit light, the display switching device 10C displays the lower left area of the incompletely closed door warning light (image P20 shown in FIG. 12) in the third partial area A3 of the first image display area 51; and (4) by causing the light source 7Db to emit light, the display switching device 10D displays the lower right area of the incompletely closed door warning light (image P25 shown in FIG. 13) in the fourth partial area A4 of the first image display area 51. In this way, as shown in FIG. 15, the incompletely closed door warning light is displayed in the entire area of the first image display area 51. Since the incompletely closed door warning light is displayed in a size larger than the incompletely closed door warning light displayed in Operational example 1, the visibility of the image for the driver of the vehicle is enhanced.

In the above Operational example 2, the case where the incompletely closed door warning light is displayed has been described. Similarly, by switching the emitting light sources 7, any one of the seat belt non-fastened warning light, the fuel level warning light, and the engine warning light is allowed to be displayed over the entire first image display area 51. That is, the display system 1 is capable of respectively switching and displaying the switching images including symbols indicating the warnings in the entire area of the first image display area 51. Thus, the symbols indicating the warnings are able to be displayed in a large size, allowing the driver of the vehicle to easily recognize the warnings.

As described above, the display system 1 in this embodiment is provided with the display switching devices 10A to 10D for switching the switching images including predetermined symbols to display the display images in the predetermined area. Each of the display switching devices 10A to 10D displays the display images in the first partial area A1 to the fourth partial area A4 not overlapping each other, respectively. Each of the display switching devices 10A to 10D is configured to: (1) display the images (P9, P14, P19, and P24) indicating one warning among the kinds of warnings as described in the above Operational example 1; and (2) display an image indicating one warning among the kinds of warnings by combining the display images displayed by the four display switching devices 10A to 10D as described in the above Operational example 2.

According to the above configuration, when displaying multiple warnings, the multiple warnings are able to be displayed in the first partial area A1 to the fourth partial area A4 as described in the above Operational example 1; and when displaying only one warning among the kinds of warnings, the warning is able to be displayed in the entire area of the first image display area 51 as described in the above Operational example 2. In this way, the display system 1 becomes a highly recognizable display system to the driver of the vehicle as an observer.

In addition, although the display system 1 in this embodiment is capable of displaying the image indicating one warning among the kinds of warnings in the first image display area 51 by combining the display images displayed by the four display switching devices 10A to 10D, the display system of the disclosure is not limited thereto. For example, by combining the display images displayed by two display switching devices of the four display switching devices 10A to 10D, the image indicating one warning among the kinds of warnings is also allowed to be displayed in the first image display area 51.

Moreover, although the display system 1 in this embodiment is configured to switch the display images by the display switching devices 10A to 10D having the configuration described above, the display system of the disclosure is not limited thereto. In one aspect of the display system of the disclosure, for example, as the display switching device, a color filter type display switching device that switches the display images according to the wavelength emitted from the light sources may be provided, and a polarizing film type display switching device that utilizes polarizing properties may also be provided.

Further, although the display system 1 in this embodiment is configured such that the image displayed by combining the display images displayed by the four display switching devices 10A to 10D in Operational example 2 is one of the images indicating the warning displayed by each of the display switching devices 10A to 10D in Operational example 1, the display system in the disclosure is not limited thereto. In one aspect of the display system of the disclosure, the image displayed by combining the display images displayed by the four display switching devices 10A to 10D may also be an image indicating a warning other than the warning displayed by each of the display switching devices 10A to 10D in Operational example 1. Further, in one aspect of the display system of the disclosure, by combining the display images displayed by the four display switching devices 10A to 10D, it is possible to: (1) display the images indicating the warning displayed by each of the display switching devices 10A to 10D in Operational example 1; and (2) display the image indicating the warning other than the warning displayed by each of the display switching devices 10A to 10D in Operational example 1.

Although the display system 1 in this embodiment is applied to the instrument panel of the vehicle, the display system of the disclosure is allowed to be applied to other devices that display multiple warnings. For example, the display system of the disclosure is allowed to be applied to heaters, air cleaners, vehicle dashboards, etc.

Embodiment 2

Other embodiments of the disclosure are described below. For convenience of explanation, members having the same functions as the member explained in the above embodiment are given the same sign and the explanation thereof will not be repeated.

This embodiment describes a display system 1A installed near a power supply port of an electric vehicle as one aspect of the display system of the disclosure.

FIG. 16 is a block diagram of the display system 1A. FIG. 17 illustrates the surroundings of the power supply port 70 of the electric vehicle in which the display system 1A is installed. FIG. 18 illustrates an image display area 71 provided near the power supply port 70. The display system 1A displays an image in the image display area 71 provided near the power supply port 70 of the electric vehicle shown in FIG. 17. The display system 1A, as shown in FIG. 16, includes a display switching device 10E, a display switching device 10F, and a controller 60A.

As shown in FIG. 18, the image display area 71 is configured by a first partial area A5 in which the image is displayed by the display switching device 10E and a second partial area A6 in which the image is displayed by the display switching device 10F. The first partial area A5 and the second partial area A6 are the upper area and the lower area of the image display area 71, respectively. The first partial area A5 and the second partial area A6 do not overlap each other.

The display switching device 10E and the display switching device 10F have the same configuration as the display switching device 10A in embodiment 1 except for the following points.

As shown in FIG. 16, the display switching device 10E is provided with five light sources 7Ea to 7Ee and a light emission controller 11E for controlling the switching on/off of the light sources 7Ea to 7Ee. (a) to (e) of FIG. 19 illustrate images displayed by the display switching device 10E. The display switching device 10E is capable of displaying each of the images P29 to P32 by irradiating light from the light sources 7Ea to 7Ed and an image P33 by irradiating light from the light source 7Ee. The images P29 to P32 indicates the battery amount of the electric vehicle, while the image P33 shows the upper half of a warning image indicating that the charging plug is not properly inserted into the outlet.

As shown in FIG. 16, the display switching device 10F is provided with two light sources 7Fa and 7Fb and a light emission controller 11F for controlling the switching on/off of the light source 7Fa and light source 7Fb. (a) and (b) of FIG. 20 illustrate images displayed by the display switching device 10F. The display switching device 10F is capable of displaying an image P34 by irradiating light from the light source 7Fa and an image P35 by irradiating light from the light source 7Fb. The image P34 indicates a charging state, while the image P35 shows the lower half of the warning image indicating that the charging plug is not properly inserted into the outlet.

The controller 60A controls the operations of the display switching device 10E and the display switching device 10F. Specifically, the controller 60A acquires vehicle information from each of the sensors provided in the vehicle and outputs instructions to the display switching device 10E and the display switching device 10F so as to display according to the acquired vehicle information.

(a) to (e) of FIG. 21 illustrate display examples of the display system 1A. In the display system 1A, when the electric vehicle is normally charged, one of signs 101 to 104 in FIG. 21 is displayed according to the battery amount. In particular, for example, if the battery amount is less than 25%, as indicated by sign 101 in FIG. 21, (1) by causing the light source 7Ea to emit light, the display switching device 10E displays the image P29 indicating that the battery amount is less than 25% in the first partial area A5 of the image display area 71; (2) by causing the light source 7Fa to emit light, the display switching device 10F displays the image P34 indicating that the battery is in a charging state in the second partial area A6 of the image display area 71.

Further, in the display system 1A, when the charging plug is not inserted into the outlet, sign 105 in FIG. 21 is displayed. In particular, (1) by causing the light source 7Ee to emit light, the display switching device 10E displays the image P33 in the first partial area A5 of the image display area 71; and (2) by causing the light source 7Fb to emit light, the display switching device 10F displays the image P35 in the second partial area A6 of the image display area 71. In this way, the warning image indicating that the charging plug is not properly inserted into the outlet is displayed. Thus, the visibility of the image for the operator who performs the charging operation is improved.

In this embodiment, although an example of applying the display system 1A to an electric vehicle is shown, the display system of this embodiment is not limited thereto. The display system in this embodiment is applied, for example, to vehicles that use gasoline, light oil, etc., as fuel, and may be configured such that an image indicating the amount of fuel supplied and an image indicating a predetermined warning are displayed by switching.

The disclosure is not limited to each embodiment described above, and various modifications are possible within the scope indicated in the claims. An embodiment obtained by appropriately combining technical means disclosed in different embodiments is also included in the technical scope of the disclosure.

Summary

The display system in aspect 1 of the disclosure displays multiple kinds of warnings in a predetermined area and includes: a display switching device, switching multiple switching images including predetermined symbols to display display images in the predetermined area. The switching images include a symbol indicating one warning among the kinds of warnings.

Based on aspect 1, the display system in aspect 2 of the disclosure may include multiple display switching devices. The display switching devices may respectively display the display images in partial areas not overlapping each other in the predetermined area and may be capable of displaying the switching images indicating one warning among the kinds of warnings. An image indicating a warning may be displayed in the predetermined area by combining the display images displayed by at least two of the display switching devices among the display switching devices.

Based on aspect 2, the display system in aspect 3 of the disclosure may be configured such that the image indicating the warning displayed by combining the display images displayed by at least two of the display switching devices among the display switching devices is an image indicating one warning among the kinds of warnings.

Based on any one of aspects 1 to 3, the display system in aspect 4 of the disclosure may be configured to be installed in an interior of a vehicle.

Based on any one of aspects 1 to 4, in the display system in aspect 5 of the disclosure, the display switching device may switch the display images by switching irradiations of light from multiple light sources. The display switching device may include a lens array in which multiple lenses are arranged and a display part including multiple pixel areas arranged to include an area through which light formed by condensing each light emitted from the light sources with each of the lenses of the lens array passes. A transmittance of each of the pixel areas may be set corresponding to a predetermined stationary symbol.

What is claimed is:

1. A display system, displaying a plurality of kinds of warnings in a predetermined area, the display system comprising:

a display switching device, switching a plurality of switching images comprising predetermined symbols to display display images in the predetermined area;

wherein the switching images comprise a symbol indicating one warning among the kinds of warnings, wherein the display switching device switches the display images by switching irradiations of light from a plurality of light sources, and comprises:

a lens array, in which a plurality of lenses are arranged, and a display part, comprising a plurality of pixel areas arranged to include an area through which light formed by condensing each light emitted from the light sources with each of the lenses of the lens array passes, wherein a transmittance of each of the pixel areas is set corresponding to a predetermined stationary symbol.

2. The display system according to claim 1, comprising a plurality of the display switching devices, wherein the display switching devices respectively display the display images in partial areas not overlapping each other in the predetermined area and are capable of displaying the switching images indicating one warning among the kinds of warnings, and an image indicating a warning is displayed in the predetermined area by combining the display images displayed by at least two of the display switching devices among the display switching devices.

3. The display system according to claim 2, wherein the image indicating the warning displayed by combining the display images displayed by at least two of the display switching devices among the display switching devices is an image indicating one warning among the kinds of warnings.

4. The display system according to claim 1, wherein the display system is installed in an interior of a vehicle.

5. The display system according to claim 2, wherein the display system is installed in an interior of a vehicle.

6. The display system according to claim 3, wherein the display system is installed in an interior of a vehicle.

* * * * *